US011240492B2

(12) United States Patent
Zhai et al.

(10) Patent No.: US 11,240,492 B2
(45) Date of Patent: Feb. 1, 2022

(54) NEURAL NETWORK BASED RESIDUAL CODING AND PREDICTION FOR PREDICTIVE CODING

(71) Applicant: Apple Inc., Cupertino, CA (US)

(72) Inventors: Jiefu Zhai, San Jose, CA (US); Xingyu Zhang, Cupertino, CA (US); Xiaosong Zhou, Campbell, CA (US); Jun Xin, Sunnyvale, CA (US); Hsi-Jung Wu, San Jose, CA (US); Yeping Su, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/254,528

(22) Filed: Jan. 22, 2019

(65) Prior Publication Data

US 2020/0236349 A1 Jul. 23, 2020

(51) Int. Cl.
*H04N 19/105* (2014.01)
*H04N 19/61* (2014.01)
*H04N 19/147* (2014.01)
*H04N 19/159* (2014.01)
*H04N 19/176* (2014.01)
*G06N 3/08* (2006.01)

(52) U.S. Cl.
CPC .......... *H04N 19/105* (2014.11); *G06N 3/08* (2013.01); *H04N 19/147* (2014.11); *H04N 19/159* (2014.11); *H04N 19/176* (2014.11); *H04N 19/61* (2014.11)

(58) Field of Classification Search
CPC ...... G06N 3/08; H04N 19/103; H04N 19/105; H04N 19/12; H04N 19/147; H04N 19/159; H04N 19/172; H04N 19/176; H04N 19/463; H04N 19/50; H04N 19/60; H04N 19/61
See application file for complete search history.

(56) References Cited

U.S. PATENT DOCUMENTS

| 5,491,776 A | 2/1996 | Dangi |
| 8,724,701 B1 | 5/2014 | Covell et al. |
| 8,805,104 B1 | 8/2014 | Covell et al. |
| 9,124,289 B2 | 9/2015 | Takamura et al. |
| 2012/0327999 A1 | 12/2012 | Francois et al. |
| 2016/0014411 A1* | 1/2016 | Sychev .................. H04N 19/52 375/240.12 |
| 2018/0114057 A1* | 4/2018 | Kim .................. G06K 9/00228 |
| 2018/0124418 A1* | 5/2018 | Van Leuven .......... H04N 19/51 |

(Continued)

FOREIGN PATENT DOCUMENTS

| WO | WO 2017/036370 A1 | 3/2017 |
| WO | WO 2018/199051 A1 | 11/2018 |
| WO | WO 2019/009452 A1 | 1/2019 |

OTHER PUBLICATIONS

International Patent Application No. PCT/US2020/013279; Int'l Search Report and the Written Opinion; dated Mar. 30, 2020; 17 pages.

(Continued)

*Primary Examiner* — Jessica M Prince
(74) *Attorney, Agent, or Firm* — BakerHostetler

(57) ABSTRACT

Systems and methods disclosed for video compression, utilizing neural networks for predictive video coding. Processes employed combine multiple banks of neural networks with codec system components to carry out the coding and decoding of video data.

16 Claims, 7 Drawing Sheets

(56) References Cited

U.S. PATENT DOCUMENTS

| | | | |
|---|---|---|---|
| 2018/0184123 A1* | 6/2018 | Terada | H04N 19/61 |
| 2018/0249158 A1* | 8/2018 | Huang | H04N 19/82 |
| 2019/0124348 A1* | 4/2019 | Yang | G06T 9/002 |
| 2019/0246102 A1* | 8/2019 | Cho | H04N 19/184 |
| 2020/0186796 A1* | 6/2020 | Mukherjee | H04N 19/107 |

OTHER PUBLICATIONS

International Patent Application No. PCT/US2020/013279; Int'l Written Opinion of the Int'l Preliminary Examining Authority; dated Dec. 11, 2020; 9 pages.

International Patent Application No. PCT/US2020/013279; Int'l Preliminary Report on Patentability; dated Apr. 13, 2021; 19 pages.

* cited by examiner

200

300

400

500

600

700

NEURAL NETWORK BASED RESIDUAL CODING AND PREDICTION FOR PREDICTIVE CODING

BACKGROUND

The present disclosure refers to video compression techniques.

Neural networks have been applied to a myriad of applications within various fields, including medicine, finance, engineering, and physics. Generally, neural networks are trained to predict information of interest based on observations. Training may be accomplished through a supervised learning process, wherein correlations between example pairs of input data (the observations) and output data (the information of interest) are learned. The larger the neural network, the better the neural network can model complex relationships between the input and output data; but, the larger the network so too is the training computational complexity. Recent increases in computing power of end-user computers have made the training of large neural networks more practical, thereby making neural networks a plausible solution for analyzing complex data. Concurrently, recent developments in machine learning technologies now enable better application of neural networks to the realm of image and video compression, addressing a growing interest in streaming High Definition (HD), High Dynamic Range (HDR), and Wide Color Gamut (WCG) content.

Generally, a neural network is comprised of a system of nodes ("neurons") that are spatially connected in a given architecture, typically layers—the nodes in one layer feed the nodes in the next layer connected to it. Training the neural network results in "knowledge" that is represented by the strength of inter-nodes connections ("synaptic weights"). A neural network's input data are fed into each node of the network's first layer as a weighted combination. Next, each node's inputted weighted combination is translated according to an activation function, resulting in the node's output data. The output data from the first layer are then propagated and similarly processed in the other intermediate layers of the network, where the last layer provides the output data. Hence, a neural network is characterized by the structure of its nodes and these nodes' activation functions. The weights associated with each node's inputs (i.e., each node's connection strengths) are learned by an iterative training process, e.g., a backpropagation algorithm, according to training parameters (learning rate and cost function) and based on examples of corresponding input and output data.

DETAILED DESCRIPTION

In the present disclosure, machine learning techniques are integrated into a predictive video coding system, wherein banks of neural networks are combined with codec system components to carry out the coding and decoding of video data.

Reference will now be made in detail to aspects of the present disclosure, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Systems and methods described in the present disclosure comprise techniques for coding a video stream, utilizing neural network (NN)-based coding as well as transform-based coding. In an aspect, for a pixel block of an input frame to be coded, a pixel block prediction may be generated using an NN-based prediction or an intra/inter-based prediction; the pixel block prediction may be performed based on input data derived from reference data of previously-coded data of the video stream. A residual block may be generated out of a difference between the pixel block and the pixel block prediction, and may be coded, resulting in a coded residual block. Then, the residual block may be coded and may be packed together with associated coding parameters in a coded video stream. The residual block may be coded according to an NN-based coding method. Alternatively, the coding of the residual block may be performed based on a transform-based coding when a confidence score associated with the NN-based coding is below a certain threshold.

Aspects of the present disclosure also describe systems and methods for decoding a coded video stream. In an aspect, for a coded residual block to be decoded, the coded residual block and associated coding parameters may be extracted from the coded video stream. The coded residual block may be decoded, based on the coding parameters, using NN-based decoding or transform-based decoding, resulting in a decoded residual block. Then, a pixel block prediction may be generated based on reference data of previously-decoded data of the coded video stream. And, a reconstructed pixel block may then be obtained as the sum of the decoded residual block and the pixel block prediction. Similar to the prediction carried out by the coder, the pixel block prediction in the decoder may be performed by an NN-based prediction or an intra/inter based prediction.

Figure 1:
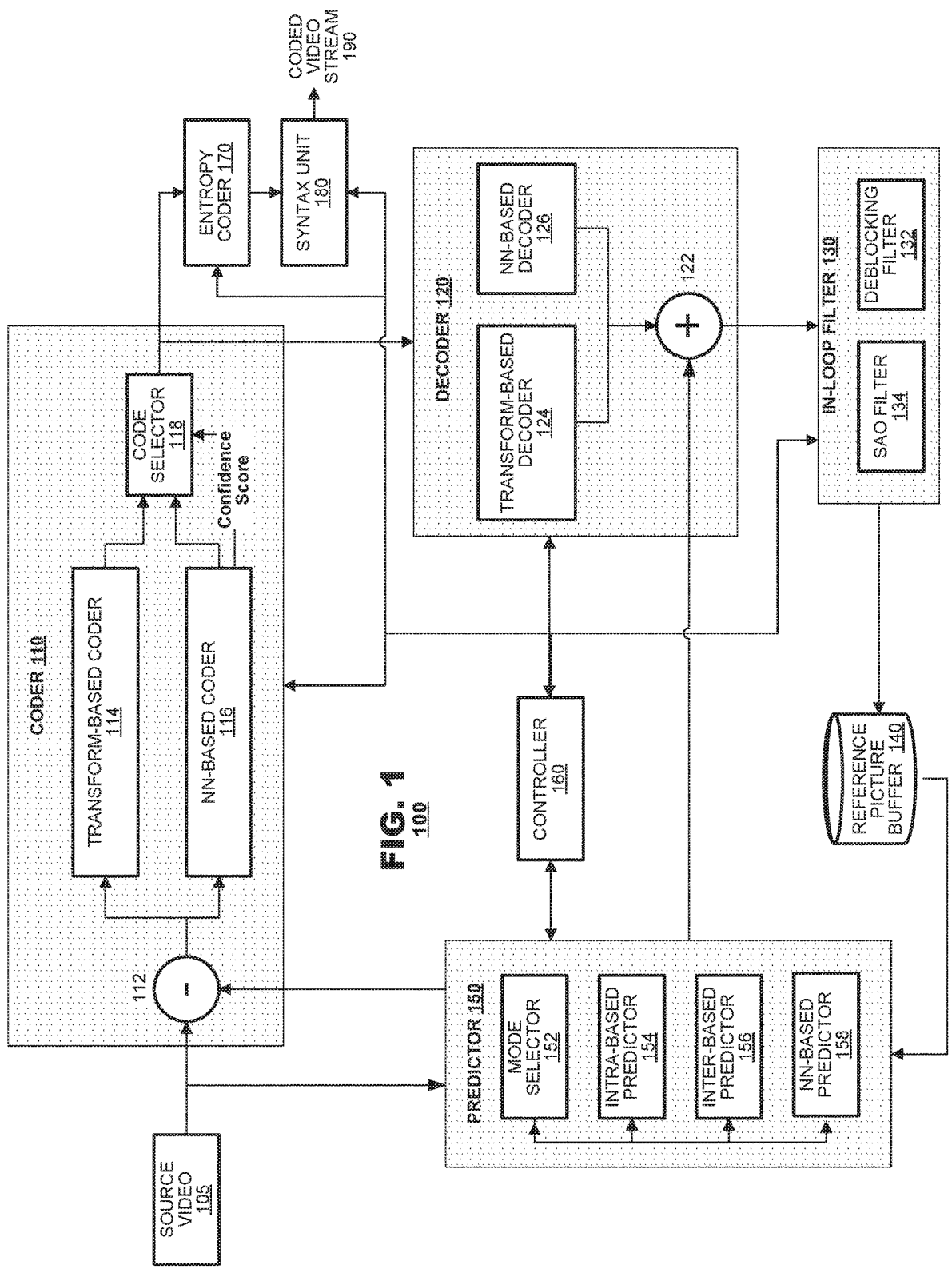
FIG. 1 is a functional block diagram of a coding system according to an aspect of the present disclosure.

FIG. 1 is a functional block diagram of a coding system 100 according to an aspect of the present disclosure. The coding system 100 may include a coder 110, a decoder 120, an in-loop filter 130, a reference picture buffer 140, a predictor 150, a controller 160, an entropy coder 170, and a syntax unit 180. The predictor 150 may predict image data for use during the coding of a newly-presented input frame 105; it may supply an estimate for an input frame 105 based on reference data retrieved from the reference picture buffer 140. The coder 110 may then code the difference between each input frame and its predicted version—namely the residual frame—applying NN-based coding, transform-based coding, or a combination of both techniques. Next, the coder 110 may provide the coded residual frame to the entropy coder 170. Typically, entropy coding is a lossless process, i.e., the coded data at an entropy coder's input may be perfectly recovered from the entropy coded data at the entropy coder's output. The entropy coder 170 may further reduce the bandwidth of the code generated by the coder 110, implementing entropy coding methods such as run length coding, Huffman coding, Golomb coding, Context Adaptive Binary Arithmetic Coding, or any other suitable coding methods. Following entropy coding, the entropy coded frame is presented to the syntax unit 180. The syntax unit 180 may pack the entropy coded frame together with the corresponding coding parameters into a coded video stream that conforms to a governing coding protocol. The coder 110 may also provide the coded frame to the decoder 120. The decoder 120 may decode the coded frame, generating a decoded frame, i.e., a reconstructed frame. Next, the in-loop filter 130 may perform one or more filtering operations on the reconstructed frame that may address artifacts introduced by the processing carried out by the coder 110 and the decoder 120. The reference picture buffer 140 may store the filtered reconstructed frames. These stored reference frames may then be used by the predictor 150 in the prediction of later-received frames.

The coding processes described herein with respect to frames may be performed at lower granularity with respect to sub-regions of the frames. For example, the coder 110, the decoder 120, and the predictor 150 may operate independently on each pixel block, slice, Largest Coding Unit ("LCU") or Coding Tree Unit ("CTU") of the frames, whether this operation encompasses one frame or multiple frames.

The coder 110 may include a subtractor 112, a transform-based coder 114, an NN-based coder 116, and a code selector 118. The transform-based coder 114, typically, comprises a transformer and a quantizer. The coder 110 may receive an input frame 105 at the subtractor's 112 input. The subtractor 112 may subtract the received frame from its corresponding predicted frame provided by the predictor 150, or vice versa. This subtraction operation may result in a residual frame. The coder 110 may then decide what coding technique to apply to the residual frame (or to each pixel block within that residual frame) employing either NN-based coding 116 or transform-based coding 114. For example, the code selector 118 may receive a confidence score from the NN-based coder 116. If this confidence score is below a certain threshold, the code selector 118 may select the code provided by the transform-based coder 118; otherwise, it may select the code provided by the NN-based coder 116. Alternatively, the coder 110 may determine, for example, based on coding parameters (e.g., prediction metadata) whether for a certain frame or block a transform-based coding 114 or an NN-based coding 116 may be applied.

If transform-based coding is applied, the transform-based coder 114 may transform the received residual frame or pixel block—mapping the residual frame or pixel block from its original pixel domain into a transform domain, resulting in a transform frame or block consisting of transform coefficients. Following this transformation, a quantizer may quantize the transform coefficients. Alternatively, if an NN-based coding is applied, the NN-based coder 116 may code the received residual frame or pixel block as is explained in detail below. As discussed, both the transform-based coder 114 and the NN-based coder 116 may be employed in parallel and the code selector 118 may select the output of either one, for example, based on a confidence score.

The transform-based coder 114 may utilize a variety of transform modes, M, as may be determined by the controller 160. Generally, transform based coding reduces spatial redundancy within a pixel block by compacting the pixels' energy into fewer transform coefficients within the transform block, allowing the spending of more bits on high energy coefficients while spending fewer or no bits at all on low energy coefficients. For example, the transform-based coder 114 may apply transformation modes such as a discrete cosine transform ("DCT"), a discrete sine transform ("DST"), a Walsh-Hadamard transform, a Haar transform, or a Daubechies wavelet transform. In an aspect, the controller 160 may: select a transform mode M to be applied; configure the transformer of the transform-based coder 114 accordingly; and store, either expressly or impliedly, the coding mode M in the coding parameters' record. Following the transformer's operation, the quantizer of the transform-based coder 114 may operate according to one or more quantization parameters, QP, and may apply uniform or non-uniform quantization techniques, according to a setting that may be determined by the controller 160. In an aspect, the quantization parameter QP may be a vector. In such a case, the quantization operation may employ a different quantization parameter for each transform block and each coefficient or group of coefficients within each transform block.

Figure 2:
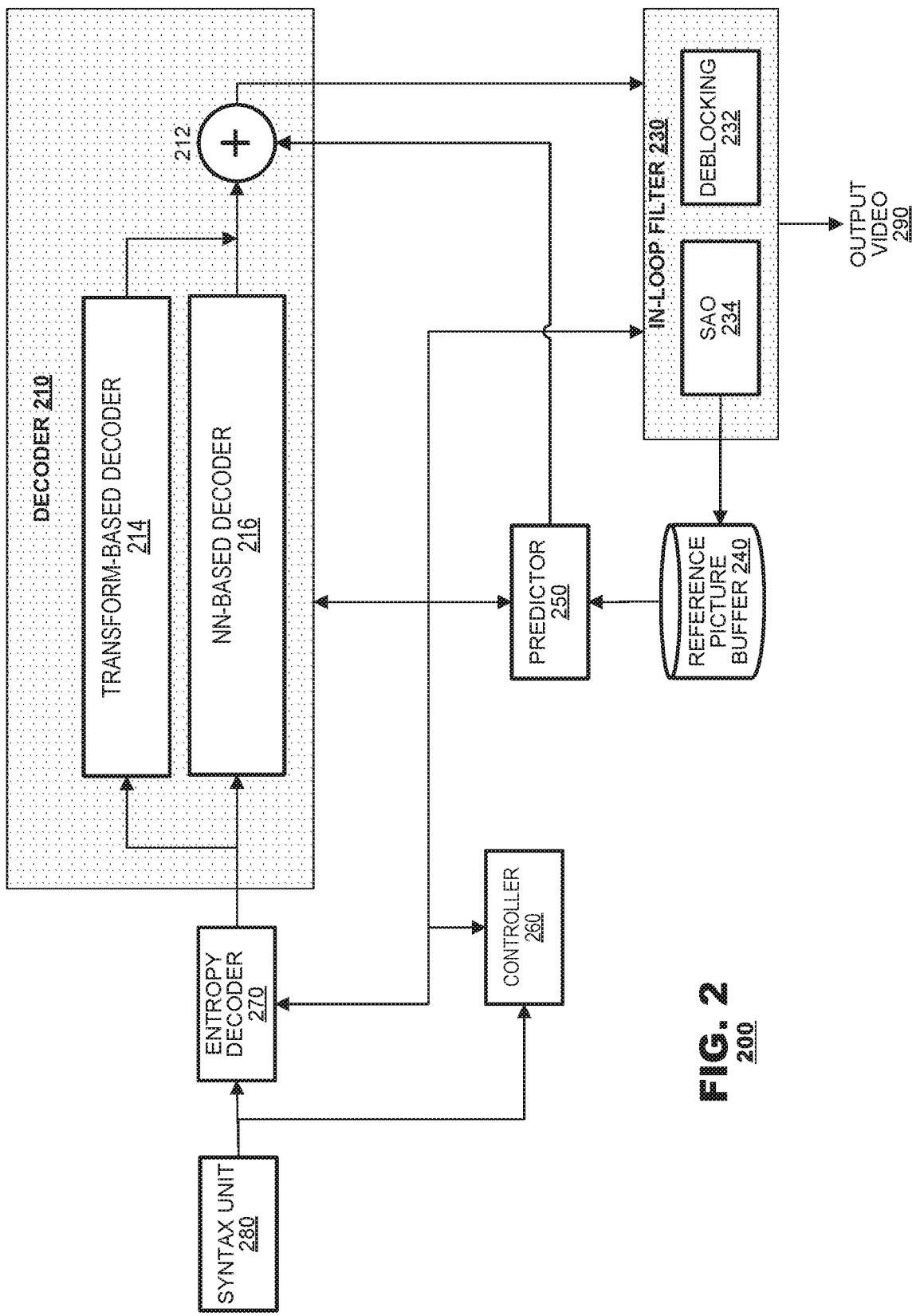
FIG. 2 is a functional block diagram of a decoding system according to an aspect of the present disclosure.

As described above, the controller 160 may set coding parameters that may be used to configure the coder 110, including parameters of the transform-based coder 114 (e.g., parameters of the transformer and the quantizer) and the NN-based coder 116. Moreover, such coding parameters may include parameters that control the logic of determining which coder, transform-based or NN-based, to employ for the coding of a certain frame or pixel block. The controller 160 may set coding parameters that may be used to also configure the entropy coder 170 and the syntax unit 180. The coding parameters may be packed together with the coded residuals into a coded video stream 190 to be available for a decoding system 200 (FIG. 2). Relevant coding parameters may also be made available for the decoder 120—making them available to a transform-based decoder 124 and an NN-based decoder 126.

A video coding system that relies on predictive coding techniques, typically, includes a decoding functionality. In an aspect, the video coding 100 of FIG. 1 comprises the decoder 120 that recovers image data of frames designated as "reference frames," which refer to frames that will be used for predictions by the predictor 150. Absent transmission errors or other operational abnormalities, the decoder 120 should produce recovered frames that are the same as the recovered reference frames generated by a far-end video decoding system 200 of FIG. 2. Generally, the decoder 120 inverts coding operations applied by the coder 110. For example, the decoder 120 may include a transform-based decoder 124, an NN-based decoder 126, and an adder 122. The transform-based decoder 124 may include an inverse quantizer and an inverse transformer. The inverse quantizer may invert operations of the quantizer of the transform-based coder 114, performing a uniform or a non-uniform de-quantization as specified by QP. Similarly, the inverse transformer may invert operations of the transformer of the transform-based coder 114, using a transform mode as specified by M. Hence, to invert the coding operation of the transform-based coder 114, the inverse quantizer and the inverse transformer may use the same quantization parameters, QP, and transform mode, M, as their counterparts. Note that quantization is a lossy operation, as the transform coefficients are truncated by the quantizer (according to QP), and, therefore, these coefficients' original values cannot be recovered by the inverse quantizer, resulting in a coding error.

The adder 122 may invert operations performed by the subtractor 112. Thus, the output of the transform-based decoder 124 or the NN-based decoder 126 may be a coded/decoded version of the residual frame outputted by the subtractor 112, namely a reconstructed residual frame. The adder 122 may add the reconstructed residual frame to the predicted frame, provided by the predictor 150 (typically, that is the same predicted frame that the predictor 150 provided for the generation of the residual frame at the output of the subtractor 112). Thus, a coded/decoded version of input frame 105, i.e., a reconstructed input frame, may be obtained at the output of the adder 122.

The in-loop filter 130 may obtain the reconstructed input frame from the adder 122, and may perform various filtering operations on the reconstructed input frame, inter alia, to mitigate artifacts generated by independently processing data from different pixel blocks, as may be carried out by the coder 110 and the decoder 120. Hence, the in-loop filter 130 may include, for example, a deblocking filter 132 and a sample adaptive offset ("SAO") filter 134. Other filters performing adaptive loop filtering ("ALF"), maximum likelihood ("ML") based filtering schemes, deringing, debanding, sharpening, resolution scaling, and other such operations may also be employed by the in-loop filter 130. Following filtering, filtered reconstructed input frames may be stored in the reference picture buffer 140.

The predictor 150 may include a mode selector 152, an intra-based predictor 154, an inter-based predictor 156, and an NN-based predictor 158. The predictor 150 may base a frame or a pixel block prediction on previously coded/decoded frames or pixel blocks, accessible from the reference data stored in the reference picture buffer 140. Prediction may be accomplished according to one of multiple prediction modes that may be determined by the mode selector 152. For example, in an intra-based prediction mode the predictor may use previously coded/decoded pixel blocks from the same currently coded input frame to generate an estimate for a pixel block from that currently coded input frame. Thus, the reference picture buffer 140 may store coded/decoded pixel blocks of an input frame it is currently coding. In contrast, in an inter-based prediction mode the predictor may use previously coded/decoded pixel blocks from either previous frames or current and previous frames to generate an estimate for a pixel block from a currently coded input frame. The reference picture buffer 140 may store these coded/decoded reference frames. Alternatively, the mode selector 152 may select NN-based prediction mode in order to generate the estimate for a currently coded input frame or the estimate for a pixel block from the currently coded input frame.

Hence, the inter-based predictor 156 may receive an input pixel block of a new input frame 105 to be coded. To that end, the inter-based predictor may search the reference picture buffer 140 for matching pixel blocks to be used in predicting that input pixel block. On the other hand, the intra-based predictor 154 may search the reference picture buffer 140, limiting its search to matching reference blocks belonging to the same input frame 105. And, the NN-based predictor 158 may use information from the same input frame and/or from previous frames to perform prediction.

All of these predictors may generate prediction metadata, PM, recording parameters used for the prediction, for example identifiers of the one or more reference frames used, the locations of the reference blocks used (e.g., motion vector(s)), or indexes and/or parameters of the neural network banks used.

The mode selector 152 may determine a prediction mode or select a final prediction mode. For example, based on prediction performances of the intra-based predictor 154, the inter-based predictor 156, and/or the NN-based predictor 158, the mode selector 152 may select the prediction mode that results in a more accurate prediction. The predicted frame or pixel blocks corresponding to the selected prediction mode may then be provided to the subtractor 112, based on which the subtractor 112 may generate the residual frame or block. Typically, the mode selector 152 selects a mode that achieves the lowest coding distortion given a target bitrate budget. Exceptions may arise when coding modes are selected to satisfy other policies to which the coding system 100 may adhere, such as satisfying a particular channel's behavior, or supporting random access, or data refresh policies. In an aspect, a multi-hypothesis-prediction mode may be employed, in which case operations of the intra-based predictor 154, the inter-based predictor 156, and/or the NN-based predictor 158, may be replicated for each of a plurality of prediction hypotheses.

The controller 160 may control the overall operation of the coding system 100. The controller 160 may select operational parameters for the coder 110 and the predictor 150 based on analyses of input pixel blocks and/or based on external constraints, such as coding bitrate targets and other operational parameters. For example, the mode selector 152 may output prediction metadata, PM, including prediction modes and corresponding parameters to the controller 160. The controller 160 may then add those prediction metadata to the record of all other coding parameters (e.g., M and QP) and may deliver those coding parameters to the syntax unit 180 to be packed with the coded residuals.

As mentioned above, during operation, the controller 160 may set operational parameters of the coder 110 at different granularities of a video frame, either on a per pixel block basis or at a larger granularity level (for example, per frame, per slice, per LCU, or per CTU). For example, the quantization parameters of the quantizer of the transform-based coder 114 may be revised on a per-pixel basis within a coded frame. Additionally, as discussed, the controller 160 may control operations of the decoder 120, the in-loop filter 130, the predictor 150, the entropy coder 170, and the syntax unit 180. For example, the predictor 150 may receive control data with respect to mode selection, e.g., specific modes to be employed and the sizes of searching windows within the reference data. The in-loop filter 130 may receive control data with respect to filter selection and their parameters.

FIG. 2 is a functional block diagram of a decoding system 200 according to an aspect of the present disclosure. The decoding system 200 may include a decoder 210, an in-loop filter 230, a reference picture buffer 240, a predictor 250, a controller 260, an entropy decoder 270, and a syntax unit 280.

The syntax unit 280 may receive the coded video stream 190 of FIG. 1 and may parse this data stream into its constituent parts, including data representing the coding parameters and the entropy coded residuals. Data representing coding parameters may be delivered to the controller 260, while data representing the entropy coded residuals may be delivered to the entropy decoder 270. The entropy decoder 270 may perform entropy decoding to invert processes performed by the entropy coder 170 and may present the decoder 210 with the coded residuals (produced by the coder 110 of FIG. 1). The predictor 250 may predict frames or blocks, currently decoded, based on reference frames available in the reference picture buffer 240, using these reference frames or pixel blocks specified by the prediction metadata, PM, provided in the coding parameters. Then, the predicted frames or blocks may be provided to the decoder 210. The decoder 210 may produce reconstructed video frames, generally by inverting the coding operations applied by the coder 110. The in-loop filter 230 may filter the reconstructed video frames. The filtered reconstructed video frames may then be outputted from the decoding system, i.e., output video 290. If the filtered reconstructed video frames are designated to serve as reference frames, then they may be stored in the reference picture buffer 240.

Collaboratively with the coder 110, and in reverse order, the decoder 210 may include a transform-based decoder 214, an NN-based decoder 216, and an adder 212. Similarly, the transform-based decoder 214 and the NN-based decoder 216 may invert the processes performed by the transform-based coder 114 and the NN-based coder 216, respectively. For example, for those frames or pixel blocks that were encoded by the transform-based coder 114, an inverse quantizer may invert quantization operations and an inverse transformer may invert transform operations that may be carried out by the transform-based coder 114. Accordingly, the inverse quantizer may use the quantization parameters QP provided by the coding parameters parsed from the coded video stream. Similarly, the inverse transformer may use the transform modes M provided by the coding parameters parsed from the coded video stream. As discussed, in a transform-based coding, typically, the quantization operation is the main contributor to coding distortions—a quantizer truncates the data it quantizes, and so the output of the inverse quantizer, and, in turn, the reconstructed residual frames at the output of the inverse transformer, possess coding errors when compared to the input presented to the quantizer and the transformer of the transform-based coder 114, respectively.

The adder 212 may invert the operation performed by the subtractor 112 in FIG. 1. Receiving predicted frames or pixel blocks from the predictor 250, the adder 212 may add these predicted data to the corresponding reconstructed residual frames or pixel blocks provided by the transform-based decoder 214 or the NN-based decoder 216. Thus, the adder 212 may output reconstructed video frames to the in-loop filter 230.

The in-loop filter 230 may perform various filtering operations on the received reconstructed video frame as specified by the coding parameters parsed from the coded video stream 190. For example, the in-loop filter 230 may include a deblocking filter 232 and a SAO filter 234. Other filters may perform ALF, ML based filtering schemes, deringing, debanding, sharpening, or resolution scaling. Other like operations may also be employed by the in-loop filter 230. In this manner, the operation of the in-loop filter 230 may mimic the operation of its counterpart in-loop filter 130 of the coding system 100. Thus, the in-loop filter 230 may output a filtered reconstructed video frame—i.e., the output video 290. The output video 290 may be consumed (e.g., displayed, stored, and/or processed) by the hosting system and/or may be further transmitted to another system.

The reference picture buffer 240 may store reference video frames, such as the filtered reconstructed video frames provided by the in-loop filter 230. Those reference video frames may be used in later predictions of other frames or pixel blocks. Thus, the predictor 250 may access reference frames or pixel blocks stored in the reference picture buffer 240, and may retrieve those reference frames or pixel blocks specified in the prediction metadata, PM. Likewise, the predictor 250 may employ a prediction method and its related parameters as specified in the prediction metadata, PM. The prediction metadata may be part of the coding parameters parsed from the coded video stream 190. The predictor 250 may then perform prediction and may supply the predicted frames or pixel blocks to the decoder 210.

The controller 260 may control overall operations of the decoding system 200. Accordingly, the controller 260 may set operational parameters for the decoder 210, the in-loop filter 230, the predictor 250, and the entropy decoder 270 based on the coding parameters parsed from the coded video stream 190. These coding parameters may be set at various granularities of a video frame, for example, on a per pixel block basis, a per frame basis, a per slice basis, a per LCU basis, a per CTU basis, or based on other types of regions defined for the input image. These operational parameters may include quantization parameters, QP, transform modes, M, and prediction metadata, PM. The coding parameters may also include NN-based coding parameters, to be used by the NN-based decoder 216 and the NN-based predictor 250. Parameters associated with neural network banks may include indexes of banks used with respect to a certain pixel block and the weights associated with each bank. For example, the coding parameters may include parameters of the neural network banks that were used in the prediction of a certain frame or block and may be provided to the predictor 250. The weights of the neural network banks that were used in the prediction of a certain frame or block may be accessible from a server or may be part of the coding parameters.

Figure 3:
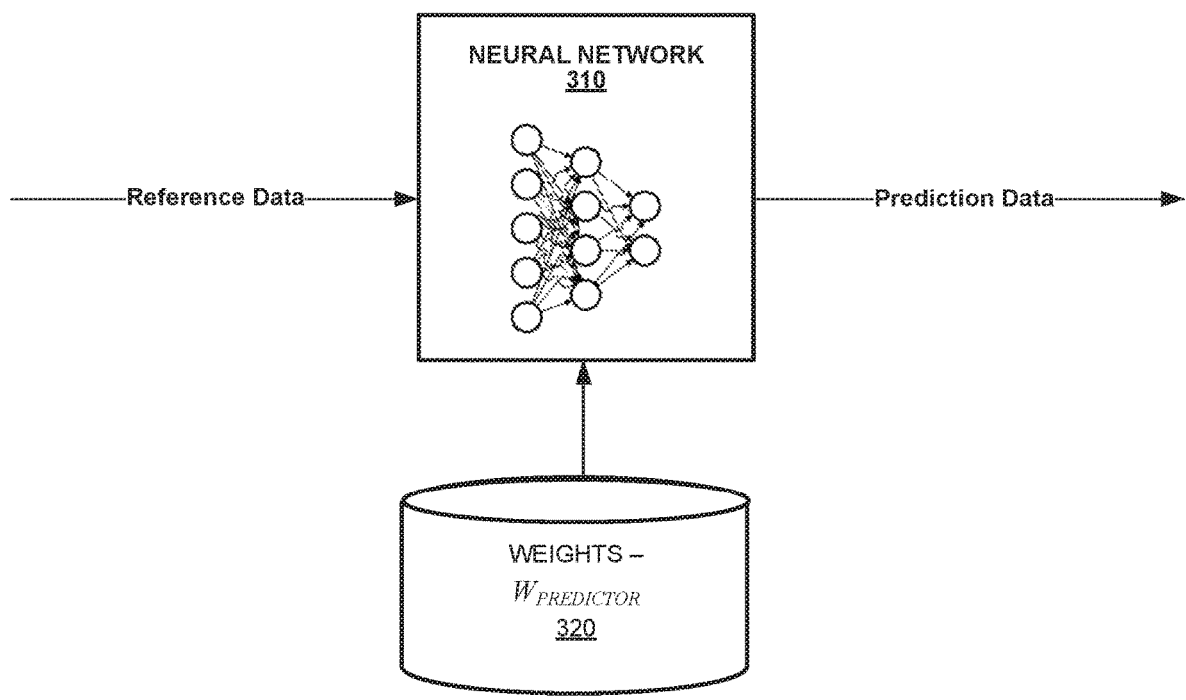
FIG. 3 is a block diagram of a single bank neural-network-based predictor according to an aspect of the present disclosure.

The NN-based predictor 158 may employ one or more neural networks to perform prediction. FIG. 3 shows a single bank NN-based predictor. For example, a neural network 310 may receive as an input previously coded pixel blocks (reference data) extracted from a currently coded frame and/or previously coded frames accessible from the reference picture buffer 140. Alternatively, or in addition, the neural network 310 may receive as an input a processed version of the previously coded pixel blocks. Then, based on weights 320, $W_{PREDICTOR}$, the network may generate prediction data, e.g., a pixel block prediction, predictive of a currently coded pixel block. Typically, $W_{PREDICTOR}$ are obtained through a training process, where the neural network "learns" the correlations between pairs of input data (observations) and output data (information of interest). Thus, when presented with a new observation, a bank, based on its learned weights, predicts the information of interest. As applied by an aspect disclosed herein, the neural network 310 may be trained to predict a currently coded pixel block based on previously coded pixel blocks (typically within the spatiotemporal neighborhood of that currently coded pixel block) or based on a representation of these previously coded pixel blocks. Such representations may include, for example, transform coefficients, provided by transforming the reference data from a pixel domain into a transform domain, or by extracting feature vectors from the reference data. As discussed, to reproduce a certain pixel block prediction in the decoder, the predictor 250 may gain access to data related to the same bank that was used in the coder in the prediction of that certain pixel block—e.g., the bank index, the bank's weights, and the reference data used for the prediction (e.g., previously coded pixel blocks in a predetermined neighborhood of the pixel block to be predicted).

Figure 4:
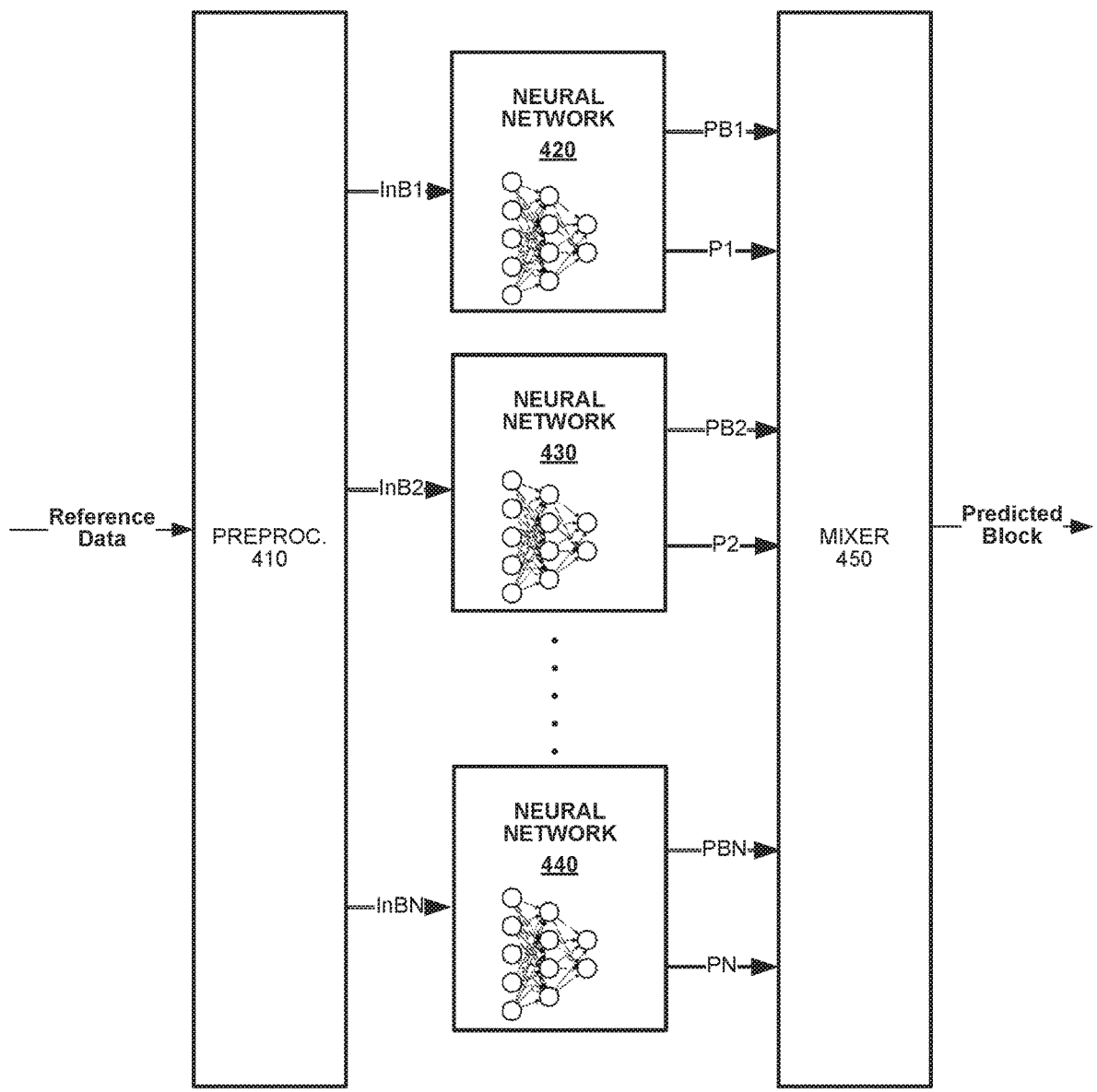
FIG. 4 is a block diagram of a multiple bank neural-network-based predictor according to an aspect of the present disclosure.

In an aspect, more than one bank may be used to generate a prediction for a pixel block. FIG. 4 shows an NN-based predictor that may comprise a preprocessor 410, multiple banks of neural networks—banks 420, 430, and 440—and a mixer 450. The input to the preprocessor 410 may be reference data accessible from the reference picture buffer 140. Such reference data may include previously coded image information, such as previously coded pixel blocks from either the currently coded frame or other previously coded frames. The reference data may be further processed by the preprocessor 410 to generate multiple versions InBn. For example, the preprocessor 410 may transform the reference data from their pixel domain into other data domains and/or may extract feature vectors out of the reference data. Alternatively, or in addition, the preprocessor 410 may deliver the reference data to banks 420, 430, and 440 as is. In an aspect, the preprocessor 410 may extract data from the reference data within various neighborhoods of the currently coded block, where these neighborhoods' spatiotemporal size and image resolution may vary. For example, the reference data may be subsampled to generate a pyramid of images at different resolutions that may be hierarchically processed to generate the prediction data. Thus, a predictor (either NN-based or inter/intra-based) may perform an initial prediction based on a low resolution version of the reference data, and may then refine this initial prediction based on a higher resolution of the reference data. Such hierarchical processing provides for more stable and accurate predictions, especially when processing high motion video content.

The number of banks that constitute the NN-based predictor 158 as well as the manner in which their predictions may be combined may be learned by the neural networks. Thus, for example, bank n may be trained to predict a pixel block, resulting in prediction $PB_n$ as well as to predict a likelihood of that prediction, denoted $P_n$. Then the mixer 450 may combine the various pixel block predictions, $PB_1$, $PB_2$, ..., $PB_N$, based on their likelihoods, $P_1$, $P_2$, ..., $P_N$, respectively. For example, the mixer 450 may combine the prediction based on a linear combination: $PB=\Sigma_{n=1}^{N} PB_n P_n$ or more generally via any nonlinear function $PB=f(PB_n, P_n)$: n=[1, N]. The number of banks to be used in the prediction of a certain pixel block may be determined by selecting a subset of the predictors with the highest likelihoods—where higher likelihood may correspond to lower prediction error.

In an aspect of the present disclosure, neural networks may be utilized to also code and decode the residual frames. Accordingly, the NN-based coder 116 may be trained to generate a coded residual frame when presented with a residual frame and the NN-based decoder 216 may be trained to generate a decoded residual frame when presented with a coded residual frame. In an aspect, prediction related data may also be fed into the NN-based coder 116 and the NN-based decoder 216. The prediction related data may include block predictions and corresponding prediction parameters. For example, prediction parameters may include the type of predictor used (NN-based, inter-based or intra-based predictor). If an NN-based predictor is used, the prediction parameters may also include the index of the banks used and their likelihoods $P_n$.

Figure 5:
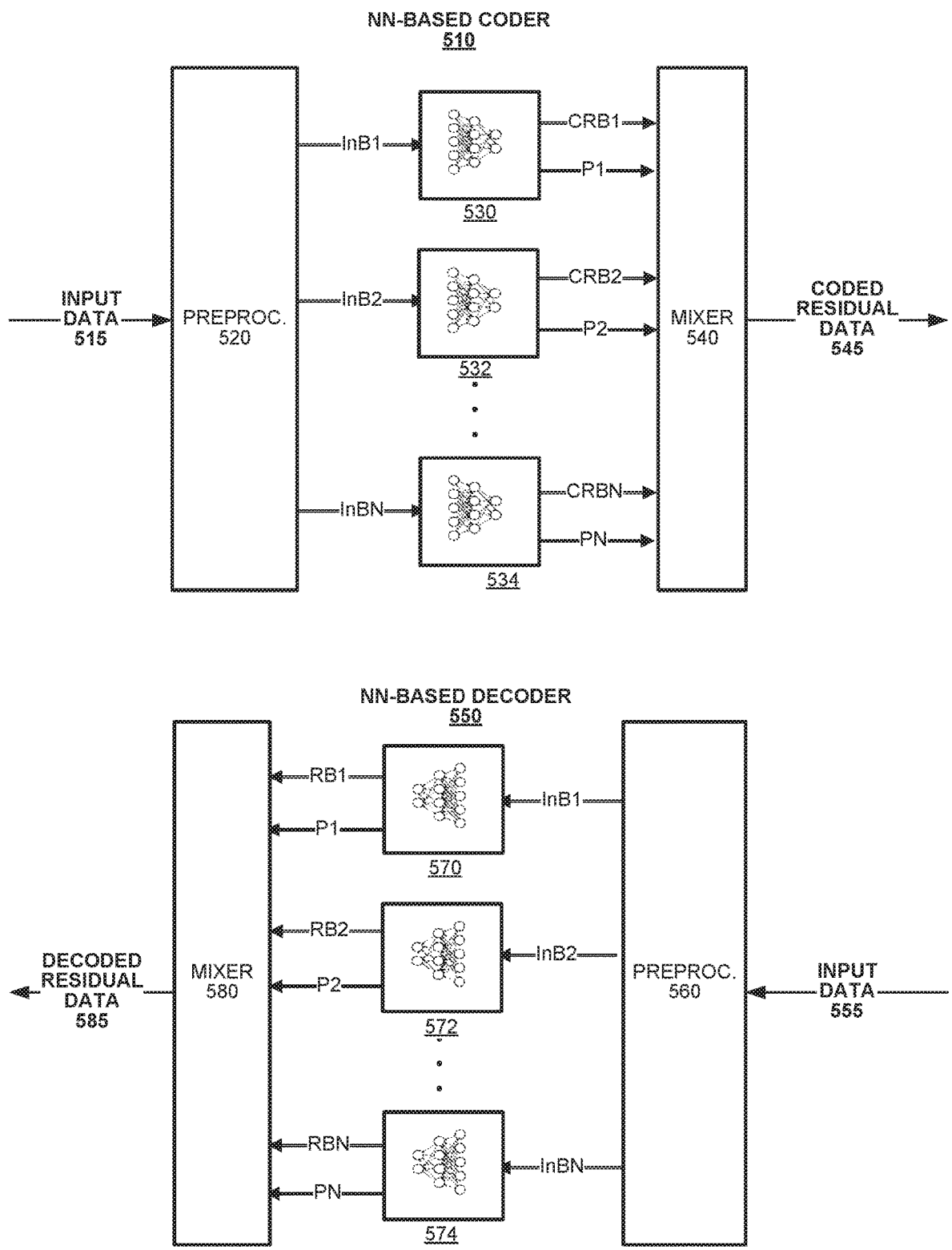
FIG. 5 is a block diagram of a multiple bank neural-network-based encoder and decoder according to an aspect of the present disclosure.

Similarly to the NN-based predictor, the NN-based coder 116 and the NN-based decoder 216 may comprise one or more neural network banks. FIG. 5 shows an NN-based coder 510 and an NN-based decoder 550. The NN-based coder 510 may comprise a preprocessor 520, banks 530, 532, and 534, and a mixer 540. Likewise, the NN-based decoder 550 may comprise a preprocessor 560, banks 570, 572, and 574, and a mixer 580. The NN-based coder 510 may receive input data 515 comprising residual data, prediction related data, or a combination thereof. Input data 515 may be at a granularity of frame sub-regions, such as pixel blocks, slices, LCUs, or CTUs. For example, when coding is with respect to pixel blocks, input data 515 may comprise residual blocks and corresponding prediction related data (block predictions and/or their prediction parameters). The NN-based coder 510 may generate coded residual data 545. For example, when coding is with respect to pixel blocks, coded residual data 545 may comprise coded residual blocks. Similarly, the NN-based decoder 550 may receive input data 555 comprising coded residual data, prediction related data, or a combination thereof. Input data 555 may be at a granularity of frame sub-regions, such as pixel blocks, slices, LCUs, or CTUs. For example, when decoding is with respect to pixel blocks, input data 555 may comprise coded residual blocks and corresponding prediction related data (block predictions and/or their prediction parameters). The NN-based decoder 550 may generate decoded residual data 585. For example, when coding is with respect to pixel blocks, decoded residual data 585 may comprise decoded residual blocks.

The preprocessor 520 may process input data 515, creating several versions of these data— $InB_1$, $InB_2$, and $InB_N$—to be presented to banks 530, 532, and 534, respectively. For example, the preprocessor 520 may transform input data 515 from one domain (e.g., pixel domain) to another domain (e.g., frequency domain) and/or may extract feature vectors out of input data 515. Alternatively, or in addition, the preprocessor 520 may deliver the input data as is to banks 530, 532, and 534. Similarly, the preprocessor 560 may process input data 555, creating several versions of these data—$InB_1$, $InB_2$, and $InB_N$—to be presented to banks 570, 572, and 574, respectively. For example, the preprocessor 560 may transform input data 555 from a code domain to a transform domain and/or may extract feature vectors out of input data 555. Alternatively, or in addition, the preprocessor 560 may deliver the input data 555 as is to banks 570, 572, and 574.

The mixer 540 of the coder and the mixer 580 of the decoder may combine the outputs generated from their respective banks. The number of banks that constitute the NN-based coder 510 and the NN-based decoder 550 as well as the manner in which their outputs may be combined may be learned by the neural networks. Thus, for example, bank n of the coder 510 may be trained to generate coded residual blocks, resulting in $CRB_n$, as well as to predict a likelihood of that code, denoted $P_n$. Then, the mixer 540 may combine the various coded residual blocks, $CRB_1$, $CRB_2$, ..., $CRB_N$, based on their likelihoods, $P_1$, $P_2$, ..., $P_N$, respectively. For example, the mixer 540 may combine the coded residual blocks based on a linear combination $CRB=\Sigma_{n=1}^{N} CRB_n P_n$ or more generally via any nonlinear function: $CRB=f(CRB_n, P_n)$: n=[1, N]. The number of banks to be used in the coding of a certain residual block may be determined by selecting a subset of $CRB_1$, $CRB_2$, ..., $CRB_N$ with the highest likelihoods—where higher likelihood may correspond to lower coding error. Likewise, bank n of the decoder 550 may be trained to generate decoded residual blocks, resulting in $RB_n$, as well as to predict a likelihood of that decoded residual block, denoted $P_n$. Then, the mixer 580 may combine the various decoded residual blocks, $RB_1$, $RB_2$, ..., $RB_N$, based on their likelihoods, $P_1$, $P_2$, ..., $P_N$, respectively. For example, the mixer 580 may combine the decoded residual blocks based on a linear combination RB=$\Sigma_{n=1}^{N}$ RB$_n$P$_n$ or more generally via any nonlinear function RB=$f$(RB$_n$, P$_n$): n=[1, N]. The number of banks to be used in the decoding may also be determined by selecting a subset of RB$_1$, RB$_2$, . . . , RB$_N$ with the highest likelihoods—where higher likelihood may correspond to lower coding error. Notice that when the NN-based coder 510 and the NN-based decoder 550 are trained, the output of the NN-based coder 510 may be used in the training process of the NN-based decoder 550.

Figure 6:
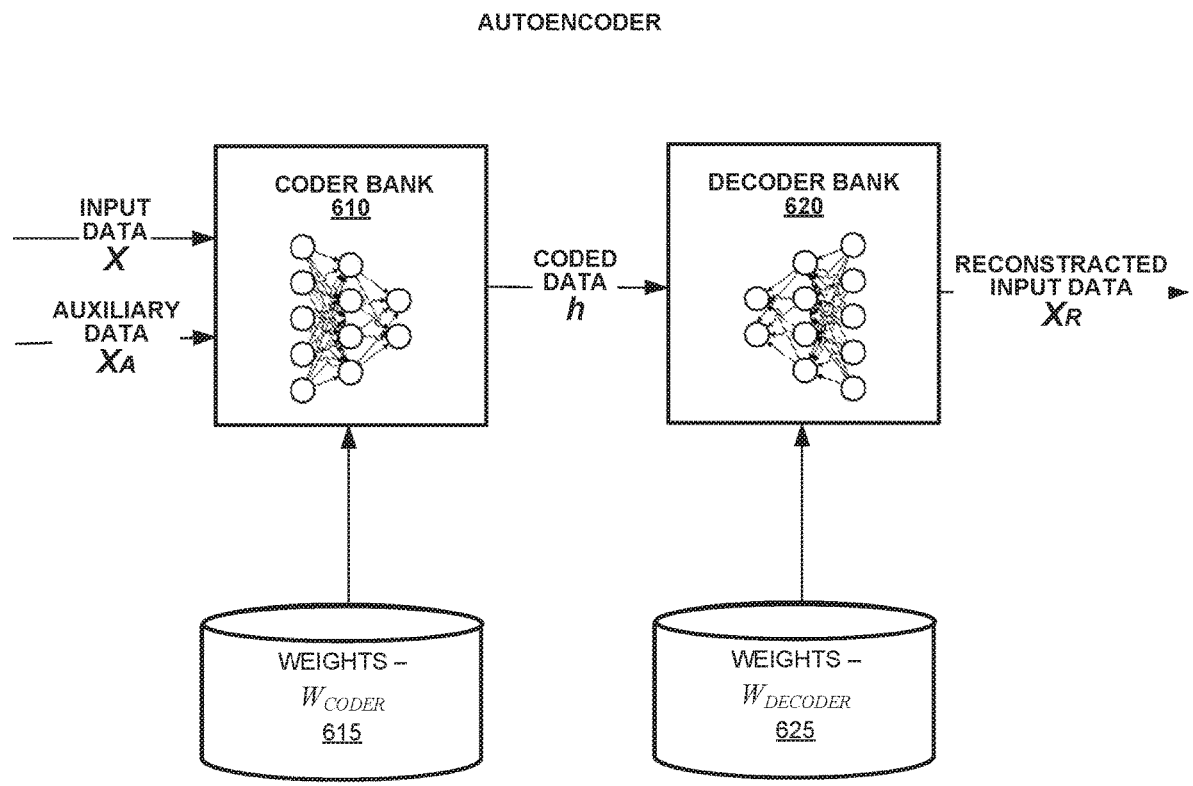
FIG. 6 is a block diagram of an autoencoder according to an aspect of the present disclosure.

In an aspect, coding and decoding of a residual block may be accomplished using an autoencoder. FIG. 6 illustrates the training of an autoencoder with respect to a bank pair of the NN-based coder 116 and the NN-based decoder 216. Generally, an autoencoder is a neural network that is trained to output a copy of its input. Accordingly, the neural network of the autoencoder may be divided into two networks (banks)—a coder bank 610 and a decoder bank 620. In an aspect, the input to the autoencoder 600 may be input data X (e.g., a residual block) and the output from the autoencoder 600 may be reconstructed input data $X_R$ (e.g., a reconstructed residual block). While a hidden layer's output data, denoted h, may constitute the output of the coder bank 610 and the input of the decoder bank 620. Thus, the autoencoder may be represented by a coding function h=$f$(X), designed to provide a condense representation of the input data X and a reconstruction function $X_R$ g(h) g($f$(X)). To obtain reconstructed input data $X_R$ that is sufficiently close to the input data X, the autoencoder is trained through a learning process that minimizes the distance between X and $X_R$—i.e., the learning process minimizes a distance function D(X, g($f$(X))). The learning process may result in coder bank's weights 615 and decoder bank's weights 625 that may later (in real time operation) be used in coding and decoding the residual blocks, respectively.

In an aspect, the autoencoder 600 may utilize auxiliary data $X_A$ in addition to the input data X, to produce $X_R$. For example, the coder bank 610 may receive as input residual blocks as well as prediction related data (e.g., block predictions and/or their prediction parameters), generated by the predictor 150. The auxiliary data may allow exploiting any correlation that may exist between the residual blocks and their corresponding prediction related data. In this case, the coding function may be h=$f$(X, $X_A$). Accordingly, to obtain reconstructed input data $X_R$ that is sufficiently close to the input data X, the autoencoder may be trained so that a distance function D(X, g($f$(X, $X_A$))) is minimized.

In an aspect of the present disclosure, banks 420, 430, and 440 of FIG. 4 and banks 530, 532, 534, 570, 572, and 574 of FIG. 5 may be of different types, characterized by, for example, their network architectures, activation functions (e.g., unipolar sigmoid, bipolar sigmoid, tan hyperbolic, or radial basis functions), hyperparameters, training cost functions, and training data category. Typical hyperparameters may be learning rate, momentum, batch size, or weight decay rate. For example, different banks of the NN-based predictor 158, the NN-based coder 116, and the NN-based decoder 126 may be trained to operate at different bitrates or with different end-to-end cost functions. Similarly, different banks may be trained based on data from different categories, this may be because video frames may contain non-stationary data, where the video's statistical properties change across a frame (spatially) and across frames (temporally). Hence, aspects of the present disclosure may model such diverse characteristics by training each bank for a certain category of video characteristics.

Supporting multiple banks may increase the complexity of the decoder's operation, especially with respect to the memory bandwidth that would be utilized for switching from one bank to another when decoding the residual blocks 216 or when performing an NN-based prediction 250. On the other hand, a large set of banks may be used to satisfy different video content characteristics. Hence, utilizing similarities among banks' parameters—i.e., banks' characteristics and weights—to reduce the overall number of banks used in the decoding process may be advantageous. Additionally, although the banks' parameters may be predefined (e.g., accessible from a server), they may also be encoded and packed into the coded video stream. In such a case, utilizing similarities among banks that are associated with neighboring pixel blocks may allow for a more efficient coding of these banks' parameters into the coded video stream. For example, the decoder 200, when predicting a certain pixel block using an NN-based predictor, may leverage a neural network bank that was already used in the prediction of a neighboring pixel block by using that same bank (or using a variation of it). Accordingly, with respect to a certain block, the coder 100 may provide the decoder 200 (as part of the prediction parameters associated with the certain block) bank's parameters to be used for the prediction of that certain block, or, instead, the coder may provide an indication directing the decoder to derive new bank's parameters based on the bank's parameters associated with a previously predicted block. Thus, in an aspect, banks' parameters that may be required by the decoder for the prediction of a certain pixel block may be derived from banks' parameters already used for the prediction of a neighboring pixel block. Similarly, in another aspect, bank's parameters that may be required by the decoder for the decoding of a certain residual block may be derived from bank's parameters already used for the decoding of a neighboring residual block.

In an aspect disclosed herein, bank's weights may be refined using on-the-fly training, utilizing online machine learning techniques. For example, the NN-based predictor 158 may comprise operations wherein banks' parameters are updated based on newly available training data. The newly available training data may be pairs of reference data (of the currently processed pixel blocks) and corresponding prediction data. These corresponding prediction data may be data generated by the intra-based predictor 154, the inter-based predictor 156, or any other method of prediction. Similarly, the NN-based coder 116 may comprise operations wherein banks' parameters are updated based on newly available training data. The newly available training data may be currently processed residual blocks, prediction related data, and corresponding coded residual blocks. For example, the corresponding coded residual blocks may be data generated by the transform-based coder 114.

Figure 7:
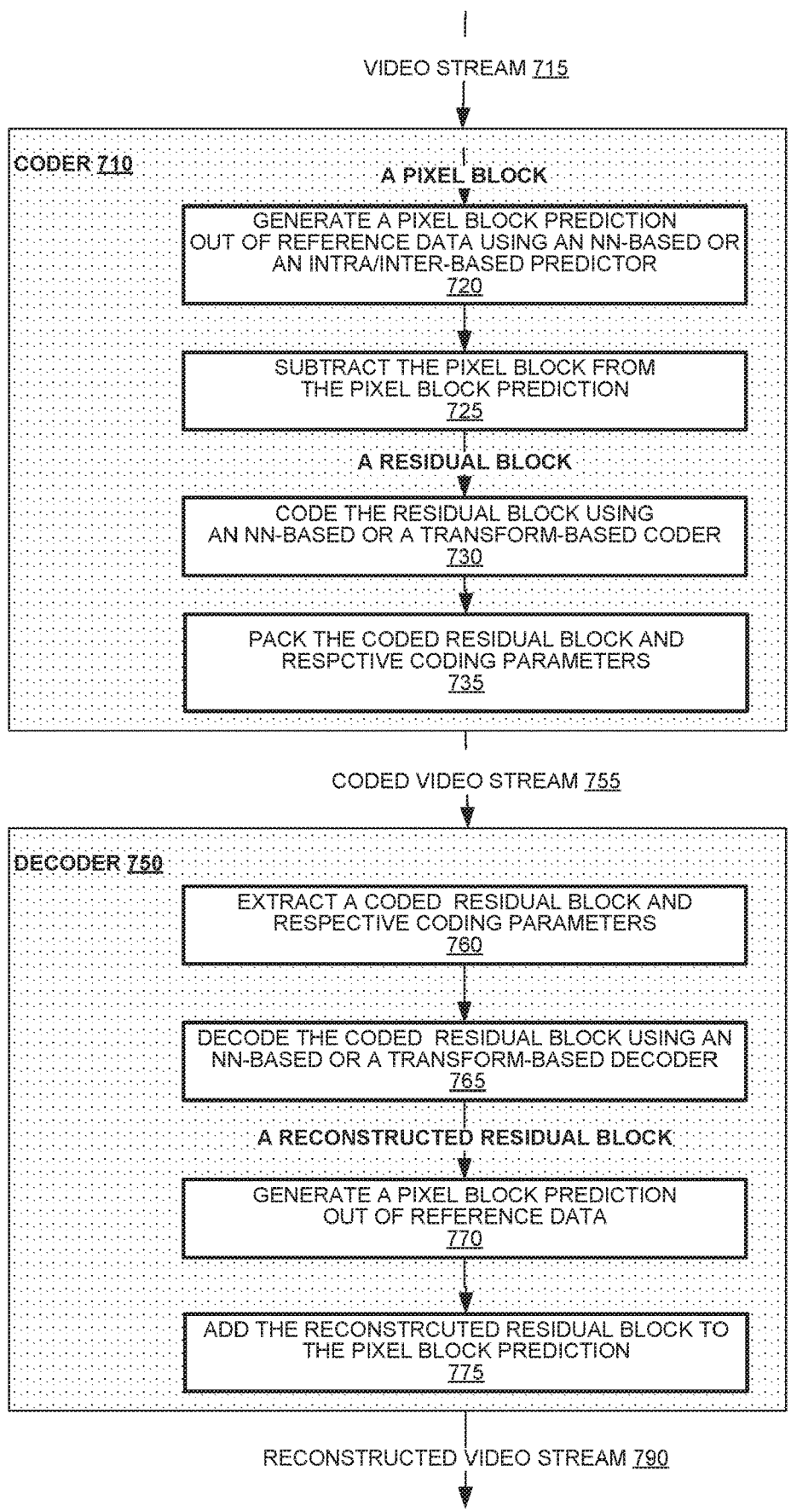
FIG. 7 is a flow diagram of a coder and a decoder according to an aspect of the present disclosure.

FIG. 7 illustrates another aspect of the present disclosure. Therein, a video coder 710 may receive a video stream 715 and may produce a coded video stream 755. The coded video stream 755 may be provided to a video decoder 750 that in turn may produce a reconstructed video stream 790. A prediction for a pixel block may be generated based on reference data (box 720) using an NN-based predictor, an intra-based predictor, or an inter-based predictor. A residual block may be produced by subtracting the pixel block from the generated pixel block prediction (box 725). The coding of the residual block may then be carried out using either an NN-based coder or a transform-based coder (box 730). The coded residual may be packed together with the respective coding parameters into the coded video stream (box 735). The coded video stream may be stored for a later reference or may be transmitted over a communication link to a receiving terminal where it may be decoded by the decoder 750 (represented by arrow 755).

During a decoding process, a coded residual block and the respective coding parameters may be extracted (box 760). Using an NN-based decoder or a transform-based decoder, the coded residual block may be decoded (box 765), resulting in a reconstructed residual block. A pixel block prediction is generated based on reference data, duplicating the prediction illustrated in box 720 (box 770). The decoder may add the reconstructed residual block to the pixel block prediction, resulting in a reconstructed pixel block (box 775). The coder 710 and the decoder 750 may operate at a granularity of a pixel block, as is demonstrated in FIG. 7, or, as discussed, may operate also at other granularity levels.

The foregoing discussion has described operations of the aspects of the present disclosure in the context of video coders and decoders. Commonly, these components are provided as electronic devices. Video decoders and/or controllers can be embodied in integrated circuits, such as application specific integrated circuits, field programmable gate arrays, and/or digital signal processors. Alternatively, they can be embodied in computer programs that execute on camera devices, personal computers, notebook computers, tablet computers, smartphones, or computer servers. Such computer programs are typically stored in physical storage media such as electronic-based, magnetic-based storage devices, and/or optically-based storage devices, where they are read into a processor and executed. Decoders are commonly packaged into consumer electronic devices, such as smartphones, tablet computers, gaming systems, DVD players, portable media players, and the like. They can also be packaged into consumer software applications such as video games, media players, media editors, and the like. And, of course, these components may be provided as hybrid systems with distributed functionality across dedicated hardware components and programmed general-purpose processors, as desired.

Video coders and decoders may exchange video through channels in a variety of ways. They may communicate with each other via communication and/or computer networks as illustrated in FIG. 1. In still other applications, video coders may output video data to storage devices, such as electrical, magnetic and/or optical storage media, which may be provided to decoders sometime later. In such applications, the decoders may retrieve the coded video data from the storage devices and decode it.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A method for coding a video stream, comprising:
    for a pixel block of an input frame to be coded, generating a pixel block prediction based on input data derived from reference data of previously-coded data of the video stream, wherein generating the prediction uses a neural-network-based prediction that includes transforming the reference data from a pixel domain to a transform domain;
    generating a residual block representing a difference between the pixel block and the pixel block prediction;
    coding the residual block and
    packing the coded residual block and associated coding parameters in a coded video stream.

2. The method of claim 1, wherein the neural-network-based coding comprises performing a transform-based coding when a confidence score associated with the neural-network-based coding is below a threshold.

3. The method of claim 1, wherein the neural-network-based coding comprises coding based on data related to the generating a pixel block prediction.

4. The method of claim 1, wherein the neural-network-based coding comprises extracting a feature vector from the residual block.

5. The method of claim 1, wherein the neural-network-based coding comprises transforming of the residual block from a pixel domain to a transform domain.

6. The method of claim 1, wherein the generating a pixel block prediction is based on reference data within a spatiotemporal neighborhood of the pixel block and at one or more data resolutions.

7. The method of claim 1, wherein the generating the pixel block prediction is performed using a neural-network-based prediction.

8. A method for decoding a coded video stream, comprising:
    for a coded residual block to be decoded, extracting the coded residual block and associated coding parameters from the coded video stream;
    decoding the coded residual block, based on the coding parameters, generating a decoded residual block;
    generating a pixel block prediction based on input data derived from reference data of previously decoded data of the coded video stream, wherein generating the pixel block prediction uses a neural-network-based prediction that includes transforming the reference data from a pixel domain to a transform domain; and generating a reconstructed pixel block, the reconstructed pixel block is a sum of the decoded residual block and the pixel block prediction.

9. The method of claim 8, wherein, the generating a pixel block prediction comprises: generating a pixel block prediction based on weights that are derived from the weights of a neural network bank used by the neural-network-based prediction for generating a neighboring pixel block prediction.

10. A computer system, comprising:
    at least one processor;
    at least one memory comprising instructions configured to be executed by the at least one processor to perform a method comprising:
    for a coded residual block to be decoded, extracting the coded residual block and associated coding parameters from the coded video stream wherein the neural-network-based prediction includes transforming the reference data from a pixel domain to a transform domain;
    decoding the coded residual block, based on the coding parameters, generating a decoded residual block; generating a pixel block prediction based on input data derived from reference data of previously decoded data of the coded video stream; and generating a reconstructed pixel block, the reconstructed pixel block is a sum of the decoded residual block and the pixel block prediction.

11. The system of claim 10, wherein the generating a pixel block prediction comprises:
    generating a pixel block prediction based on weights that are derived from the weights of a neural network bank used by the neural-network-based prediction for generating a neighboring pixel block prediction.

12. The method of claim 8, wherein the generating the pixel block prediction is performed using a neural-network-based prediction.

13. The method of claim 12, wherein the neural-network-based decoding comprises decoding based on data related to the generating a pixel block prediction.

14. A method for coding a video stream, comprising:
for a pixel block of an input frame to be coded, generating a pixel block prediction, using a neural-network-based prediction, based on input data derived from reference data of previously-coded data of the video stream wherein the neural-network-based prediction includes transforming the reference data from a pixel domain to a transform domain;
generating a residual block representing a difference between the pixel block and the pixel block prediction;
coding the residual block and
packing the coded residual block and associated coding parameters in a coded video stream.

15. The method of claim 14, further comprising:
generating a second pixel block prediction using one of an inter-based prediction or an intra-based prediction; and
using the second pixel block prediction for the generating a residual block when an estimate of distortion associated with the pixel block prediction is higher than an estimate of distortion associated with the second pixel block prediction.

16. The method of claim 14, wherein the neural-network-based prediction comprises extracting a feature vector from the reference data.

* * * * *